United States Patent
Larkins et al.

(10) Patent No.: US 8,521,361 B2
(45) Date of Patent: *Aug. 27, 2013

(54) RIDE HEIGHT CONTROL SYSTEM AND METHOD FOR CONTROLLING LOAD DISTRIBUTION AT TARGET RIDE HEIGHT IN A VEHICLE SUSPENSION SYSTEM

(75) Inventors: William T. Larkins, Manchester, NH (US); Edward Lanzilotta, Reading, MA (US); Damian Harty, Coventry (GB)

(73) Assignee: Fourth Floor Associates, Inc., Manchester, NH (US)

( * ) Notice: Subject to any disclaimer, the term of this patent is extended or adjusted under 35 U.S.C. 154(b) by 329 days.

This patent is subject to a terminal disclaimer.

(21) Appl. No.: 12/858,197

(22) Filed: Aug. 17, 2010

(65) Prior Publication Data

US 2012/0046827 A1   Feb. 23, 2012

(51) Int. Cl.
*B60G 17/018* (2006.01)
*B60G 17/015* (2006.01)

(52) U.S. Cl.
USPC .............................................. 701/37; 280/5.5

(58) Field of Classification Search
USPC .............. 701/37, 38, 40, 48, 91, 45; 280/5.5, 280/5.505, 5.507, 5.512, 5.515, 5.52, 5.524, 280/47.22, 678–687, 787–788; 702/41; 188/322.21, 266.2
See application file for complete search history.

(56) References Cited

U.S. PATENT DOCUMENTS

| | | | |
|---|---|---|---|
| 4,468,050 A | 8/1984 | Woods et al. | |
| 5,037,119 A * | 8/1991 | Takehara et al. | 180/415 |
| 5,060,959 A | 10/1991 | Davis et al. | |
| 5,342,079 A | 8/1994 | Buma | |
| 5,452,919 A | 9/1995 | Hoyle et al. | |
| 5,483,448 A | 1/1996 | Liubakka et al. | |
| 5,624,105 A | 4/1997 | Runkel | |
| 6,173,974 B1 | 1/2001 | Raad et al. | |
| 6,234,493 B1 | 5/2001 | Kleen et al. | |
| 6,260,860 B1 | 7/2001 | Brookes et al. | |
| 6,264,213 B1 | 7/2001 | Kutscher | |
| 6,369,583 B1 | 4/2002 | Sommer et al. | |
| 6,389,341 B1 | 5/2002 | Davis | |
| 6,471,196 B2 | 10/2002 | Stiller | |

(Continued)

OTHER PUBLICATIONS

International Search Report and Written Opinion dated Jan. 6, 2012 issued in PCT Patent Application No. PCT/US2011/047334, 10 pages.

(Continued)

*Primary Examiner* — Muhammad Shafi
(74) *Attorney, Agent, or Firm* — Grossman Tucker Perreault & Pfleger PLLC

(57) ABSTRACT

A ride height control system and method may be used to control load distribution at wheel locations in a vehicle suspension system at target ride height. Load distribution may be controlled by adjusting the forces applied by the suspension system at respective wheel locations while maintaining a target ride height. In an exemplary air spring suspension system or hydropneumatic suspension system, the applied forces may be adjusted by adjusting the pressure in the suspension system at the respective wheel locations. The ride height control system and method may determine and establish balanced target ride height forces (e.g., planar forces) to be applied at the wheel locations of the vehicle to prevent a cross-jacking condition. The ride height control system and method may also determine and establish target ride height forces for a vehicle on an uneven surface to prevent imbalances caused by wheel displacement.

21 Claims, 10 Drawing Sheets

(56) References Cited

U.S. PATENT DOCUMENTS

| | | |
|---|---|---|
| 6,575,484 B2 | 6/2003 | Rogala et al. |
| 6,648,309 B2 | 11/2003 | Beck |
| 6,669,216 B1 | 12/2003 | Elser et al. |
| 6,834,736 B2 | 12/2004 | Kramer et al. |
| 6,904,344 B2 | 6/2005 | LaPlante et al. |
| 6,994,136 B2 | 2/2006 | Stanczak |
| 7,104,547 B2 | 9/2006 | Brookes et al. |
| 7,261,304 B2 | 8/2007 | Trudeau et al. |
| 7,299,112 B2 | 11/2007 | LaPlante et al. |
| 7,357,397 B2 | 4/2008 | Brookes et al. |
| 7,370,849 B2 | 5/2008 | Beck |
| 7,497,452 B2 | 3/2009 | Schedgick |
| 7,607,667 B2 | 10/2009 | Brookes et al. |
| 7,624,994 B2 | 12/2009 | Stegmann |
| 2005/0284716 A1* | 12/2005 | Ammon et al. ........... 188/322.21 |
| 2006/0142916 A1 | 6/2006 | Onuma et al. |
| 2008/0021611 A1 | 1/2008 | Hiebert et al. |
| 2009/0216403 A1* | 8/2009 | Holbrook ........................ 701/37 |

OTHER PUBLICATIONS

International Preliminary Report on Patentability dated Feb. 28, 2013 issued in PCT Patent Application No. PCT/US2011/047334, 5 pages.

Notice of Allowance dated Jan. 17, 2013 issued in U.S. Appl. No. 12/858,226, 13 pages.

International Search Report and Written Opinion Report dated Apr. 9, 2012 issued in PCT Patent Application No. PCT/US2011/047321, 12 pages.

* cited by examiner

RIDE HEIGHT CONTROL SYSTEM AND METHOD FOR CONTROLLING LOAD DISTRIBUTION AT TARGET RIDE HEIGHT IN A VEHICLE SUSPENSION SYSTEM

TECHNICAL FIELD

The present invention relates to vehicle suspension systems and more particularly, to a ride height control system and method for controlling load distribution at target ride height in a vehicle suspension system.

BACKGROUND INFORMATION

Vehicle suspension systems may include ride height control systems for controlling the height of a vehicle relative to a surface on which the vehicle rides. Existing ride height control systems generally operate based on the position of the sprung mass (e.g., the vehicle chassis) relative to the unsprung mass (e.g., the vehicle wheels or axle). A ride height control system may monitor and adjust the position at each wheel location to provide a target ride height. The target ride height may be controlled by the operator manually, for example, by selecting pre-set target ride heights. The target ride height may also be controlled dynamically based on vehicle operating conditions (e.g., speed).

Ride height control may be provided in suspension systems, such as air spring suspension systems, hydropneumatic suspension systems and steel spring systems, in which the ride height is dependent upon the volume of air and/or hydraulic fluid in the system. In hydropneumatic suspension systems, for example, the ride height may be increased by pumping hydraulic fluid (e.g., mineral oil) into the system at each of the wheel locations. The ride height is often controlled by adding or removing air/fluid at each of the wheel locations independently to achieve a target ride height position at that wheel location. In the existing ride height control systems, which control ride height based only on position, the target ride height may be achieved at the wheel locations but in any vehicle with more than three wheels there exist many possible load conditions with the wheels at the correct height. As a result, different pressures in the suspension system at different wheel locations can occur and thus different loads are supported by the suspension system at different wheel locations, unnoticed by the operator. These problems may be compounded in vehicles with a larger number of wheels (e.g., eight wheel vehicles) such as those used by the military.

One problem that occurs in vehicle suspension system with existing ride height control systems is a cross-jacking condition. Under a cross-jacking condition, a load imbalance exists at the wheel locations even though the vehicle may be at the target ride height. When ride height is controlled only based on position, the target ride height may be achieved but with significantly higher loads at some of the wheel locations compared to other wheel locations. The suspension system at the wheel locations at two opposite corners, for example, may be pressurized significantly higher (e.g., 90 psi) than the wheel locations at the other two opposite corners (e.g., 30 psi) while still maintaining the same ride height. In terms of the vehicle load, two of the opposite corner wheel locations may each support 1500 lb. of a 4000 lb. vehicle and the other two opposite corner wheel locations may each support 500 lb. These load imbalances may adversely affect the handling of the vehicle, for example, as a result of different tractions on the tires and/or different suspension response at the different wheel locations.

Another problem may occur in vehicle suspension systems with existing ride height control systems as a result of a wheel displacement condition. Under a wheel displacement condition, one (or some subset) of the wheels of a vehicle may be stopped on a surface irregularity that causes the wheel(s) to be displaced in an upward or downward direction. If the vehicle is stopped with a wheel on a rock or curb, for example, the wheel will be displaced in an upward direction. If the vehicle is stopped with the wheel in a ditch, the wheel will be displaced in a downward direction.

The upward displacement, in particular, will cause compression of the suspension system at that location and the wheel and chassis will have a closer position with a higher pressure and load at that wheel location. Existing ride height control systems that control ride height based only on position will interpret this closer position as requiring an adjustment to raise the ride height at that location in an attempt to maintain the target ride height. The ride height is raised, for example, by adding air or fluid to the suspension system at the upwardly displaced wheel location. The position at the other locations may then be independently adjusted to maintain the target ride height, which may result in different pressures and loads at the different wheel locations. When the vehicle is moved back to a relatively flat surface after these adjustments, the loads may be unbalanced and the ride height may initially need to be readjusted. These load imbalances and ride height adjustments caused by wheel displacement conditions may also adversely affect the vehicle performance and handling.

BRIEF DESCRIPTION OF THE DRAWINGS

These and other features and advantages will be better understood by reading the following detailed description, taken together with the drawings wherein.

DETAILED DESCRIPTION

A ride height control system and method, consistent with embodiments described herein, may be used to control load distribution at wheel locations in a vehicle suspension system at target ride height. Load distribution may be controlled by adjusting the forces applied by the suspension system at respective wheel locations while maintaining a target ride height. In an exemplary air spring suspension system or hydropneumatic suspension system, the applied forces may be adjusted by adjusting the pressure in the suspension system at the respective wheel locations.

In one embodiment, the ride height control system and method may determine and establish balanced target ride height (TRH) forces to be applied at the wheel locations of the vehicle to prevent a cross-jacking condition. The balanced TRH forces may be planar reaction forces having force vectors whose tips collectively best fit a plane. In another embodiment, the ride height control system and method may also determine and establish TRH forces for a vehicle on an uneven surface to prevent imbalances caused by wheel displacement. The TRH forces for a vehicle on an uneven surface may be determined by transforming TRH forces that should be applied at ride height under a level condition (i.e., wheels level on a relatively even surface) back to a current condition (i.e., a wheel displacement condition on the uneven surface).

As used herein, "load" refers generally to the load (or portion of the vehicle load) applied to the suspension system by an unsprung mass at a wheel location of the vehicle. The load may be expressed in the form of a reaction force applied by the suspension system or a pressure (i.e., force per unit area) in the suspension system. As used herein, "force parameter" refers to a force (e.g., N) or some other parameter related to force such as force per unit area or pressure (e.g., psi). As used herein, "ride height" refers to the position of the sprung mass (e.g., the vehicle chassis) relative to the unsprung mass (e.g., the wheel or axle) and "target ride height" refers to the relative position that the suspension system has been commanded to achieve either manually or dynamically. As used herein, "actual position" and "actual force parameter" refer to the relative position and force parameter, respectively, measured under current conditions at a respective wheel location of the vehicle. As used herein, "level condition" refers to a vehicle being located on a relatively flat surface such that the wheels are relatively level with minimal or no wheel displacement from the intended position.

Figure 1:
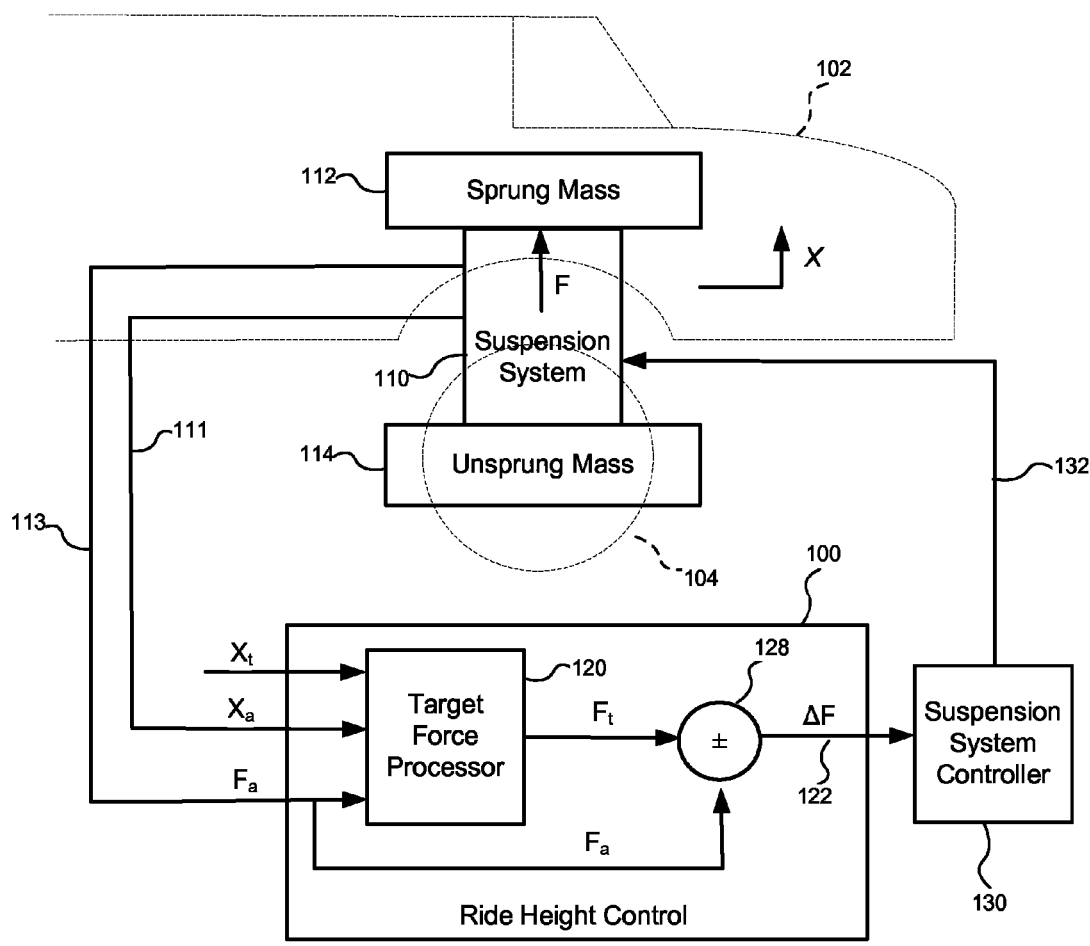
FIG. 1 is a schematic functional block diagram of a ride height control system, consistent with the present disclosure, for controlling load distribution at target ride height in a vehicle suspension system.

Referring to FIG. 1, a ride height control system 100, consistent with embodiments described herein, may be used with a suspension system 110 in a vehicle to control target ride height and target ride height load distribution. The suspension system 110 is located between a suspended or sprung mass 112 (e.g., a vehicle chassis 102) and an unsprung mass (e.g., a vehicle wheel assembly 104) and supports the sprung mass 112 at each wheel location. Only one wheel location is illustrated for purposes of simplification; however, the ride height control system 100 may be used to control the target ride height loads independently at each of the wheel locations in a multi-wheel vehicle. The vehicle may be a conventional four wheel vehicle, such as a car, truck or sport utility vehicle, or may be a vehicle with more than four wheels such as a military vehicle (e.g., with six or eight wheels), a tracked vehicle, or any vehicle with four or more wheels.

As shown, the load supported at each wheel location may be represented as the reaction force F applied by the suspension system 110 to the sprung mass 112 and the ride height may be represented as the relative position X between the sprung mass 112 and the unsprung mass 114. The ride height or relative position X is declared such that it is at a maximum when the sprung mass 112 is farthest from the unsprung mass 114 and decreases as the sprung mass 112 moves closer to the unsprung mass 114. The position X at a wheel location generally decreases as the force F increases because higher loads force the sprung mass 112 and the unsprung mass 114 together and compress the suspension system 110.

The target ride height and the target ride height load distribution may be controlled by changing the relative position X and the reaction force F provided by the suspension system 110 at one or more of the wheel locations. The suspension system 110 may include, for example, a hydropneumatic suspension system or an air spring suspension system in which the target ride height and target ride height load distribution may be controlled, for example, by adding or removing hydraulic fluid or gas to the suspension system 110 at one or more wheel locations. The suspension system 110 may also include a coil spring suspension system.

The suspension system 110 at each wheel location may include sensors for measuring conditions in the suspension system and generating signals proportional to the conditions to provide the variables or parameters used by the ride height control system 100. In particular, the suspension system 110 may include a relative position sensor for generating a signal related to or indicative of the relative position X between the sprung and unsprung masses 112, 114 at the wheel location. The suspension system 110 may also include a force sensor, such as a strain gauge, for directly measuring the load or reaction force F and generating a signal proportional to the load or force at the wheel location. Additionally or alternatively, suspension system 110 may include sensors that measure other parameters related to force such that the actual force may be calculated from those parameters. For example, a pressure sensor may be used to measure a pressure in the suspension system at the wheel location and the actual force or load may be calculated from the measured pressure. The suspension system 110 may also include other sensors for providing other parameters such as accelerometers monitoring acceleration of the sprung mass 112 and/or unsprung mass 114.

The ride height control system 100 generally includes a target force processor 120 that processes data and determines a target ride height (TRH) force parameter $F_t$ related to a target force to be applied by the suspension system 110 at one or more of the wheel locations when the vehicle is at the target ride height. The TRH force parameter $F_t$ may include a force value and/or a pressure value. As will be described in greater detail below, the determination of the TRH force parameter $F_t$ may depend upon a desired load balancing scheme and/or the current wheel displacement condition of the vehicle.

The target force processor 120 may receive data representing the parameters used to determine the target force parameter $F_t$ such as a target ride height $X_t$, an actual position $X_a$ at each wheel location, and an actual force parameter $F_a$ (e.g., measured force or measured pressure) related to the actual force being applied at each wheel location. The actual position and actual force parameter data may be obtained, for example, from sensor signals 111, 113 generated by sensors in the suspension system 110 and representing the measured conditions. The target ride height data may be obtained from stored data or from data provided by another control system. The target force processor 120 may then determine the TRH force parameter $F_t$ for each wheel location based on, at least in part, one or more of these parameters.

The ride height control system 100 may also include an error signal generator 128 for generating an error signal 122 representing a force parameter error or difference $\Delta F$ between the determined TRH force parameter $F_t$ and the actual force parameter $F_a$ for each respective wheel location. A suspension system controller 130 may receive the error signal 122 and provide a suspension system control signal 132 to the suspension system 110 in response to the error signal 122, thereby providing a control loop. Other control systems may also be used to control the suspension system 110 in response to the TRH force parameter $F_t$.

The suspension system control signal 132 may control the suspension system 110, for example, to adjust the force applied at one or more of the wheel locations until the force parameter error is minimized, thereby adjusting the load distribution across all of the wheel locations. Minimizing the force parameter error may include reducing the force parameter error to a minimum value or to below a threshold. If the suspension system 110 is a hydropneumatic suspension system, for example, the forces may be adjusted by adding or removing fluid to or from the dampers at each wheel location of the suspension system. If the suspension system 110 is an air spring system, the forces may be adjusted by increasing or decreasing the air pressure in the air springs at each wheel location of the system. The suspension system controller 130 may provide pump and/or valve control signals to the pump(s) and/or valve(s) that control the supply of fluid or air.

The ride height control system 100 may be implemented as any circuit or circuitry, including an integrated circuit, configured to perform the functions described herein. As used in any embodiment herein, "circuit" and "circuitry" may include, for example, singly or in any combination, hardwired circuitry, programmable circuitry, state machine circuitry, and/or firmware that stores instructions executed by programmable circuitry. "Integrated circuit", as used in any embodiment herein, may include a circuit or circuitry in the form of a semiconductor device and/or microelectronic device, such as, for example, a semiconductor integrated circuit chip. Those skilled in the art will recognize various implementations for the ride height control system 100 including any combination of hardware, software and firmware that is configured or programmed to perform the functions described herein.

In one embodiment, the target force processor 120 determines planar TRH force parameters that provide planar reaction forces at the wheel locations of the vehicle at target ride height and thus a balanced load distribution. The force vectors associated with the planar forces generally fit a best fit plane. As used herein, "best fit plane" refers to the plane which comes closest to the tips of all of the force vectors; "planar forces" refers to a group of reaction forces having force vectors with tips substantially lying in the best fit plane (i.e., without requiring mathematically perfect planarity). The best fit plane may be determined relative to force vectors associated with actual forces being applied to the sprung mass at the wheel locations.

Figure 2A:
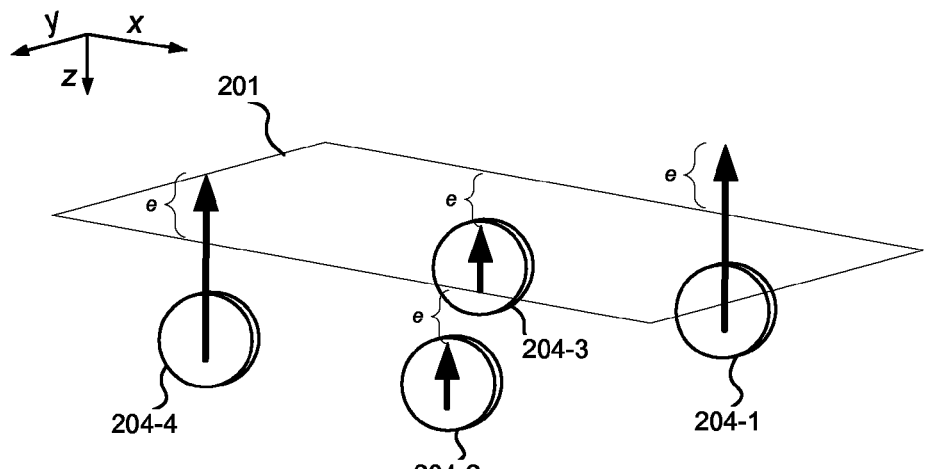
FIG. 2A is a schematic diagram of unbalanced force vectors at wheel locations of a four wheel vehicle under a cross-jacking condition.
Figure 2B:
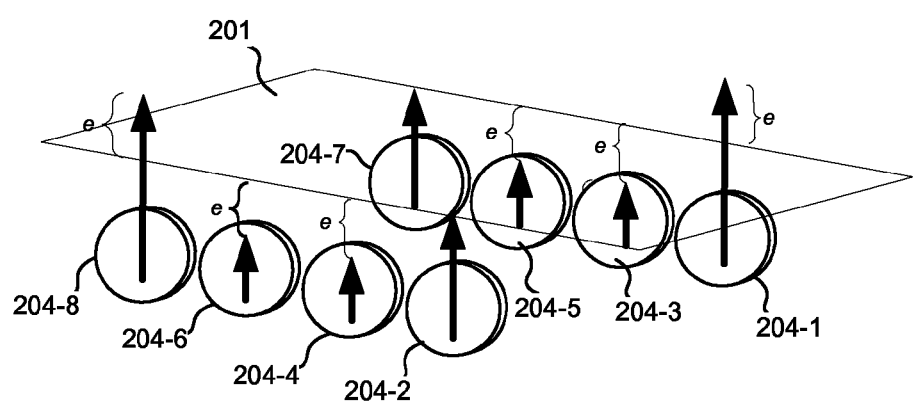
FIG. 2B is a schematic diagram of unbalanced force vectors at wheel locations of an eight wheel vehicle under a cross-jacking condition.
Figure 2C:
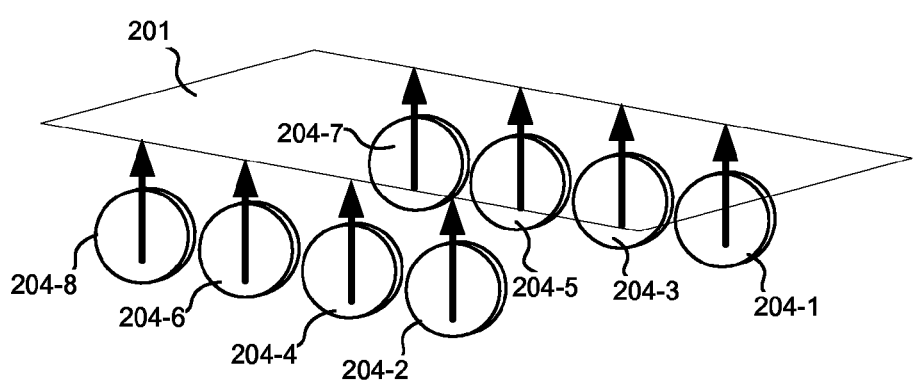
FIG. 2C is a schematic diagram of balanced planar force vectors at wheel locations of an eight wheel vehicle.

FIGS. 2A-2C illustrate reaction forces resulting from loads at each of the wheel locations. The reaction forces are shown as force vectors normal to the ground plane in the position of the centers of pressure of the contact patches of the wheel. FIG. 2A illustrates an example of a cross-jacking condition in a four wheel vehicle at ride height. As shown by the force vectors, the reaction forces at the locations of wheels 204-1, 204-4 are higher than the reaction forces at the locations of wheels 204-2, 204-3. FIG. 2B illustrates another example of a cross-jacking condition in an eight wheel vehicle at ride height. In this example, the loads and reaction forces at the center wheels 204-3 to 204-6 are lower than the loads and reaction forces at the corner wheels 204-1, 204-2, 204-7, 204-8.

If the vehicle is in a level condition on a relatively flat surface and the loads are balanced with no cross-jacking, the tips of the force vectors substantially fall in a best fit plane 201. FIG. 2C shows the example of the eight wheel vehicle with the force vectors fitted to the best fit plane 201. In this example, the best fit plane 201 is the plane that best fits the unbalanced force vectors such that the errors (e) between the force vectors and the plane 201 are minimized. When the best fit plane 201 is determined, the errors (e) represent the force differential needed to achieve the planar forces.

Figure 3:
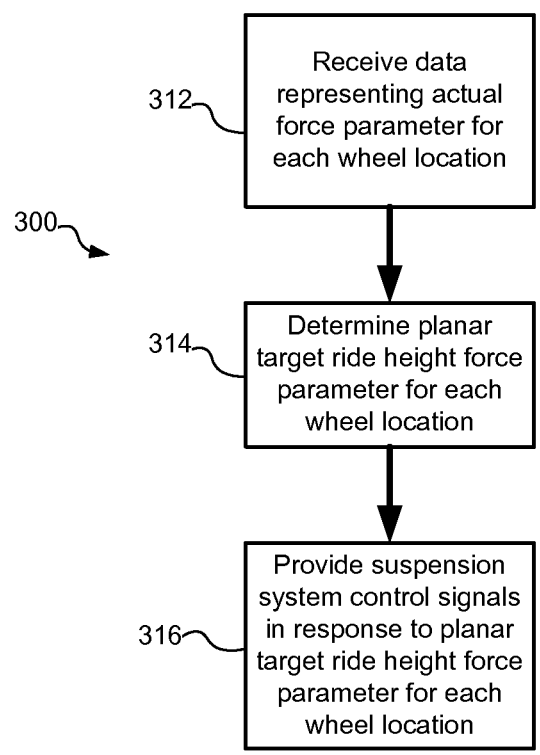
FIG. 3 is a flow chart illustrating one embodiment of a method of controlling a suspension system to provide load balancing.

As illustrated in FIG. 3, one method 300 of controlling a suspension system adjusts the forces applied by the suspension system at the wheel locations such that the associated force vectors are fit to a best fit plane while maintaining the target ride height. This method 300 generally includes receiving 312 data representing actual force parameters (e.g., measured forces or pressures) related to the actual forces applied at the wheel locations. Data representing other parameters used to calculate the actual forces, such as rod area, motion ratio, spring load at full compression, spring rate, and relative position, may also be received.

In an embodiment where the actual force parameter is measured pressure, the actual force $F_{ap}$ from pressure at a respective wheel location may be calculated from the measured pressure $P_a$ as follows:

$$F_{ap} = P_a * A_{rod}/RM \qquad (1)$$

where $A_{rod}$ is the area of the supporting rod applying the pressure in the damper of the suspension system and RM represents the motion ratio. The motion ratio may be a linear or non-linear motion ratio known to those skilled in the art and may be a constant or a non-constant.

In an embodiment where the actual force also includes a spring force component, the spring force $F_{aspr}$ may be calculated as a function of the actual position $F(X_a)$. For a linear spring, for example, the spring force $F_{aspr}$ may be calculated as follows:

$$F_{aspr} = F_{s0} - (K_{spr} * X_a) \qquad (2)$$

where $F_{s0}$ is the spring load at full compression (N), $K_{spr}$ is the spring rate (N/m) and $X_a$ is the actual position of the sprung mass relative to the unsprung mass. In general, the properties of the spring are known at design time and do not vary substantially over the life of the vehicle. The actual force $F_a$ may then be calculated by adding the damper force component from the pressure and the spring force component as follows:

$$F_a = F_{ap} + F_{aspr} \qquad (3)$$

The method 300 further includes determining 314 a planar TRH force parameter (e.g., a target force or target pressure) for each wheel location and providing 316 suspension system control signals to control the forces applied at one or more wheel locations in response to the planar TRH force parameter. The planar TRH force parameter may be determined by determining a best fit plane relative to the tips of the force vectors associated with the actual forces for the wheel locations and by determining the forces having vectors with tips located in that plane, as will be described in greater detail below. The suspension control signals may be provided based on a difference or error between the planar TRH force parameter and the actual force parameter at the wheel locations, for example, using a control loop as discussed above and shown in FIG. 1. In one embodiment, for example, the planar TRH force parameter includes a target pressure, the actual force parameter includes a measured pressure, and the suspension control signals cause the pressure in the suspension system at the respective wheel locations to be adjusted to minimize the difference or error between the target pressure and measured pressure.

One method for determining a best fit plane applies planar equations and a least-squares technique to the known wheel locations and forces. As a frame of reference, the x-axis is directed longitudinally (e.g., forward) of the vehicle, the y-axis is directed laterally (e.g., to the right/starboard side) of the vehicle, and the z-axis is directed downward (e.g., see FIG. 2A). For a vehicle with N axles, there are 2N wheel locations and thus 2N points to be fit to the plane. The general equation of a plane is $Ax+By+Cz=D$ and reformatted to the z-intercept form is $C_x x + C_y y + C_z = z$ where the coefficient $C_z$ represents the z-axis intercept and the coefficients $C_x$ and $C_y$ represent the planar slopes. If all of the points (i.e., tips of the force vectors) lie on a plane, the values of the point locations (i.e., force values) can be inserted into the plane equation without violating the equality. If no single plane passes through all of the points, a geometric plane may be found that is relatively close to all of the points (i.e., the best fit plane). To find the geometric plane that best fits 2N points representing the tips of the force vectors, a system of equations may be constructed as follows:

$$A\bar{c}=\bar{b} \quad (4)$$

where the vector $$\bar{c} = \begin{bmatrix} C_x \\ C_y \\ C_z \end{bmatrix}$$

is the set of plane coefficients and the vector $$\bar{b} = \begin{bmatrix} F_{z-1} \\ F_{z-2} \\ \vdots \\ F_{z-2N} \end{bmatrix}$$

is the set of reaction forces in the Z axis at the respective 2N wheel locations in a vehicle with N axles, and the 2N×3 matrix $$A = \begin{bmatrix} x_1 & y_1 & 1 \\ x_2 & y_2 & 1 \\ \vdots & \vdots & \vdots \\ x_{2N} & y_{2N} & 1 \end{bmatrix}$$

is the collection of x-y wheel location values.

Because the wheel locations and the reaction forces are known, the matrix A and vector $\bar{b}$ are known. The best fit plane is the geometric plane with the minimal amount of differential or error (e) from the set of force vectors (e.g., plane 201 shown in FIGS. 2A-2C). A least squares method may be applied to the system of planar equations to minimize the error as follows:

$$\|\bar{e}\|^2 = \|A\bar{c}-\bar{b}\|^2 \quad (5)$$

The vector $\bar{c}$ of best fit plane coefficients may be determined from the system of planar equations as follows:

$$A\bar{c}=\bar{b}$$

$$A^T A \bar{c} = A^T \bar{b}$$

$$\bar{c} = (A^T A)^{-1} A^T \bar{b} \quad (6)$$

Using the coefficients of the best fit plane, the vector of error values relative to the best fit plane may be determined as follows:

$$\bar{e} = A(A^T A)^{-1} A^T \bar{b} - \bar{b} \quad (7)$$

As mentioned above, the error vector $\bar{e}$ represents the differential between the actual forces and the planar target forces. The planar target force vector $\bar{b}+\bar{e}$ may thus be determined as follows:

$$\bar{b}+\bar{e} = A(A^T A)^{-1} A^T \bar{b} \quad (8)$$

Accordingly, the planar TRH force for the respective wheel locations may be determined by matrix calculations using the actual forces and the known wheel locations. Because the matrix $A(A^T A)^{-1} A^T$ is an invariant property of a vehicle with fixed wheel locations in the x-y axis, it may be computed once, thus simplifying the calculations and reducing the processing requirements. Therefore, the planar TRH force $F_{t-p}$ at the wheel locations 1 to 2N may be determined using the following matrix calculation:

$$F_{t-p} = F_a \times A_{pre} \quad (9)$$

where $F_a$ represents the force vector including the set of actual forces $F_{a-1}$ to $F_{a-2N}$ at the wheel locations and $A_{pre}$ represents the precomputed wheel location matrix $A(A^T A)^{-1} A^T$. The actual forces $F_{a-1}$ to $F_{a-2N}$ at the wheel locations may be used to calculate the planar TRH force $F_{t-p}$ regardless of the wheel displacements at the wheel locations and thus the planar TRH force $F_{t-p}$ is independent of the terrain on which the vehicle is located.

If the actual force parameter measured by the suspension system is pressure, a target pressure associated with the planar TRH force $F_{t-p}$ may be determined from the planar TRH force $F_{t-p}$. The target pressure associated with the planar TRH force $F_{t-p}$ may determined, for example, by removing any spring load contribution at ride height and solving for pressure as follows:

$$P_{t-p} = (F_{t-p} - F_{spr})/A_{rod} \quad (10)$$

where $F_{spr}$ is the spring force at target ride height ($F_{spr} = F(X_t)$) and for a linear spring may be calculated as $F_{spr} = F_{s0} + K_{spr} * X_t$ where $F_{s0}$ is the spring load at full compression (N), $K_{spr}$ is the spring rate (N/m), and $X_t$ is the target ride height. Referring back to FIG. 1, the target force processor 120 in the ride height control system 100 may perform the matrix calculations and the force to pressure conversion calculations described above.

In another embodiment, the error vector $\bar{e}$ may be calculated separately instead of or in addition to calculating the planar target load vector $\bar{b}+\bar{e}$. The error vector $\bar{e}$ may be used to determine the level of out-of-plane in the load vectors, which may be used as a diagnostic indicator, for example, for low tire pressure. In other embodiments, other planar TRH force parameters may be calculated by multiplying the pre-computed matrix $A_{pre}$ by a vector including a set of other force parameters.

In other embodiments, the planar equations above may be used to determine the unevenness of a surface on which the vehicle is located. In these embodiments, the vector $\bar{b}$ is the set of measured wheel extension values in the z axis (i.e., the positions $X_{a-1}$ to $X_{a-2N}$ for wheel locations 1 to 2N). The equations may be solved in the same manner discussed above to produce an error vector $\bar{e}$ representing the extent to which the wheels extend out of a plane, thereby corresponding to the "unevenness" of the surface on which the wheels are located. If all of the values of the error vector $\bar{e}$ are zero, the surface is perfectly flat (a possible but unlikely condition). A threshold value may be defined such that a surface is deemed to be flat if all of the values of the error vector $\bar{e}$ are within the threshold or deemed to be uneven if at least one of the values of the error vector $\bar{e}$ exceeds the threshold.

In another embodiment, the target force processor 120 determines current condition target force parameters that provide appropriate loading at the wheel locations under a current wheel displacement condition based on the desired loading that should be applied at the wheel locations to achieve target ride height under a level condition. In this embodiment, the current condition may be a non-level condition when the vehicle is located on an uneven surface and a wheel or subset of wheels experiences a wheel displacement condition. The desired loading under the level condition may be planar forces as described above or some other balanced load distribution. The loading or forces for one displacement condition may be mapped or transformed to another displacement condition using the monotonic force-deflection characteristic of the suspension system, as will be described in greater detail below.

Figure 4A:
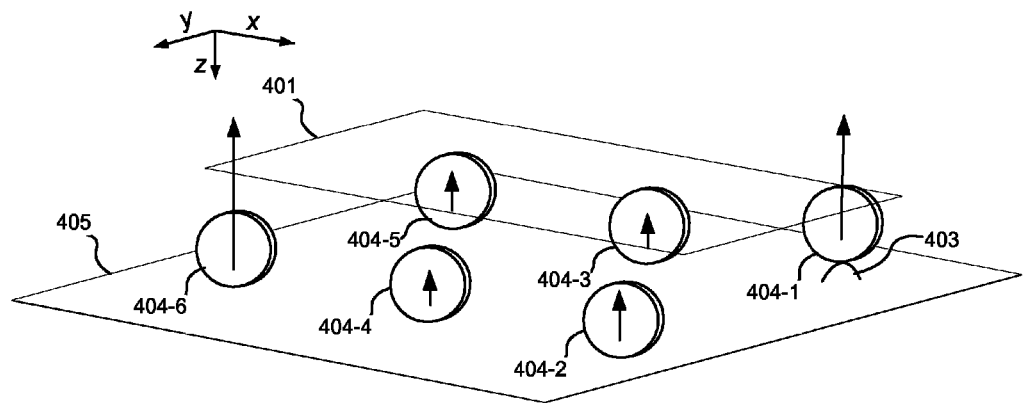
FIG. 4A is a schematic diagram of force vectors at wheel locations of a vehicle on a relatively uneven surface with a wheel displacement condition.

FIG. 4A illustrates an example of a wheel displacement condition. As shown, the vehicle is stopped with the wheel 404-1 located on an irregularity 403 that protrudes relative to the ground 405, which causes an upward displacement condition at the wheel 404-1. As a result, the wheel 404-1 may experience a higher reaction force and other wheels (e.g., wheels 404-4, 404-3) may experience lower forces, resulting in an imbalance. If the vehicle were leveled to target ride height based on the actual positions at the current condition (i.e., the wheel displacement condition), the vehicle would become imbalanced as soon as the vehicle moves to a relatively flat surface and may require re-leveling to target ride height.

Figure 4B:
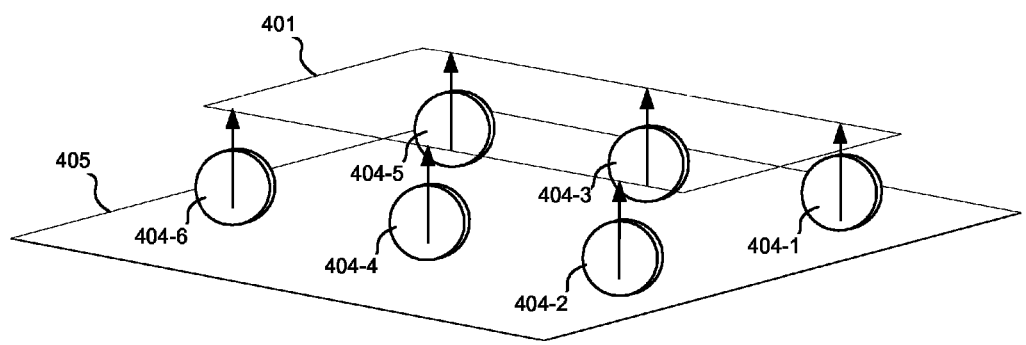
FIG. 4B is a schematic diagram of force vectors at wheel locations of a vehicle on an even surface with a level condition.

To prevent improper forces from being applied under the current condition as a result of the wheel displacement, the target force processor 120 may determine level condition TRH force parameters corresponding to the forces that should be applied at the wheel locations of the suspension system assuming the vehicle is at target ride height in a level condition on a flat surface. Those level condition TRH force parameters may then be mapped or transformed back to the current condition to determine the current condition target force parameters that should be applied under the current condition. In one embodiment, as shown in FIG. 4B, the level condition TRH force parameters correspond to the planar TRH forces with force vectors that fit a best fit plane 401 and may be determined as described above.

Figure 5:
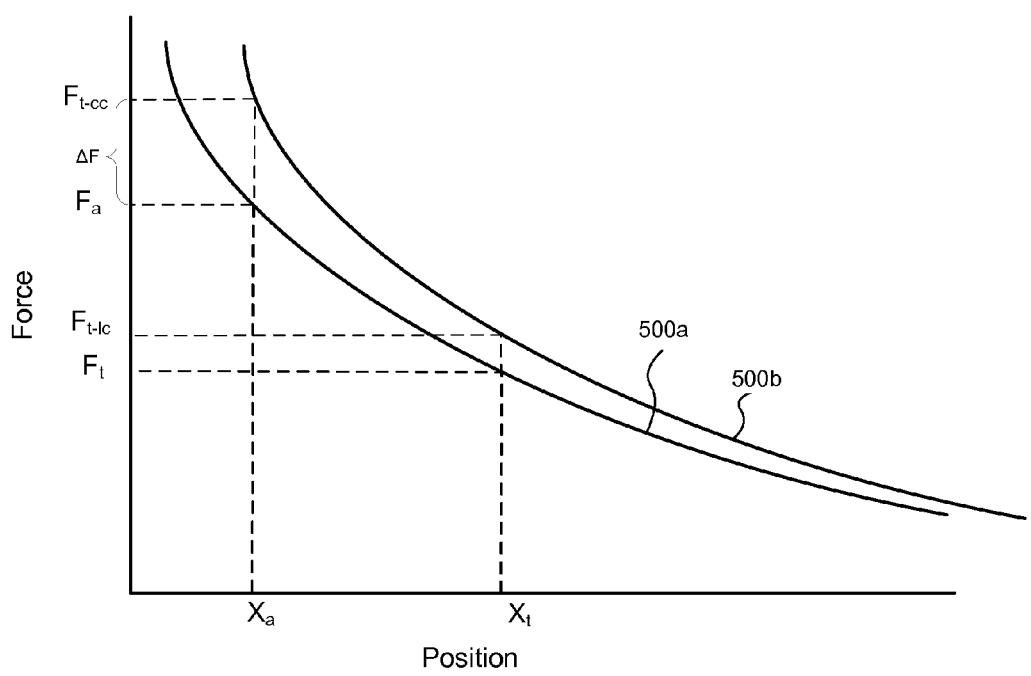
FIG. 5 is a diagram illustrating force as a function of relative position in a suspension system and the transformation of forces from a level condition to a current condition.

The mapping or transformation of loads or forces between different displacement conditions may be based on the monotonic force-deflection characteristic of the suspension system, for example, as illustrated in FIG. 5. As shown in FIG. 5, the load or force F in the suspension system at a wheel location and the position X of the suspension system at the wheel location are related by the non-linear force-deflection characteristic of the suspension system, which is represented by curves 500a, 500b. The illustrated monotonic force-deflection characteristic may correspond to an air spring suspension system or a simple hydropneumatic suspension system (e.g., with one accumulator coupled to a damper). Other hydropneumatic suspension systems (e.g., with multiple accumulators) are described in greater detail below. When fluid or air is added or removed to the suspension system, the force and/or position increases or decreases but the monotonic force-deflection characteristic remains essentially the same. The force-deflection curves 500a, 500b, for example, illustrate the force-deflection characteristic in the suspension system before and after fluid or air is added to the system.

As shown, the force (e.g., $F_a$) that is applied by the suspension system at one position (e.g., $X_a$) is different than the force (e.g., $F_t$) that is applied by the suspension system at another position (e.g., $X_t$) for a given amount of air or fluid in the system. Adding air or fluid may cause the force (e.g., $F_t$) at a given position (e.g., $X_t$) to change to a different force (e.g., $F_{t-lc}$). When the equations that define the force-deflection characteristic (e.g., F=k(X)*X where k(X) is a variable spring rate) and the force at one position (e.g., $F_a$ at $X_a$) are known, the force at other positions on a force-deflection curve may be determined. If the current condition of the vehicle is a wheel displacement condition with an actual position $X_a$ and an actual force $F_a$, for example, the force $F_t$ that would be applied at the target ride height $X_t$ if the vehicle were on a relatively flat surface (i.e., without the wheel deflection) is located on the same force-deflection curve 500a and may be determined from equations that define the force-deflection characteristic.

In contrast to the force $F_t$ that would be applied at the target ride height $X_t$, a level condition TRH force $F_{t-lc}$ is the desired force that should be applied if the vehicle were at target ride height $X_t$ under level condition on a relatively flat surface. The level condition TRH force $F_{t-lc}$ determined for the target ride height $X_t$ may involve an adjustment to the force $F_t$ at the target ride height $X_t$ (e.g., to produce planar forces). Thus, the intersection of the target ride height position $X_t$ and the level condition TRH force $F_{t-lc}$ lies on a different force-deflection curve 500b corresponding to the adjusted force at the level condition. Given the level condition TRH force $F_{t-lc}$ and the target ride height $X_t$, therefore, the corresponding current condition target force $F_{t-cc}$ that should be applied at the current position $X_a$ is located on the same force-deflection curve 500b and may be determined from the equations that define the force-deflection characteristic. As such, the level condition TRH force $F_{t-lc}$ is mapped or transformed back to the current condition. Referring back to FIG. 1, the ride height control system 100 may thus control the suspension system 112 to adjust the force at each respective wheel location to minimize the force differential or error ΔF between an actual force parameter $F_a$ under the current condition and a current condition target force parameter $F_{t-cc}$.

Figure 6:
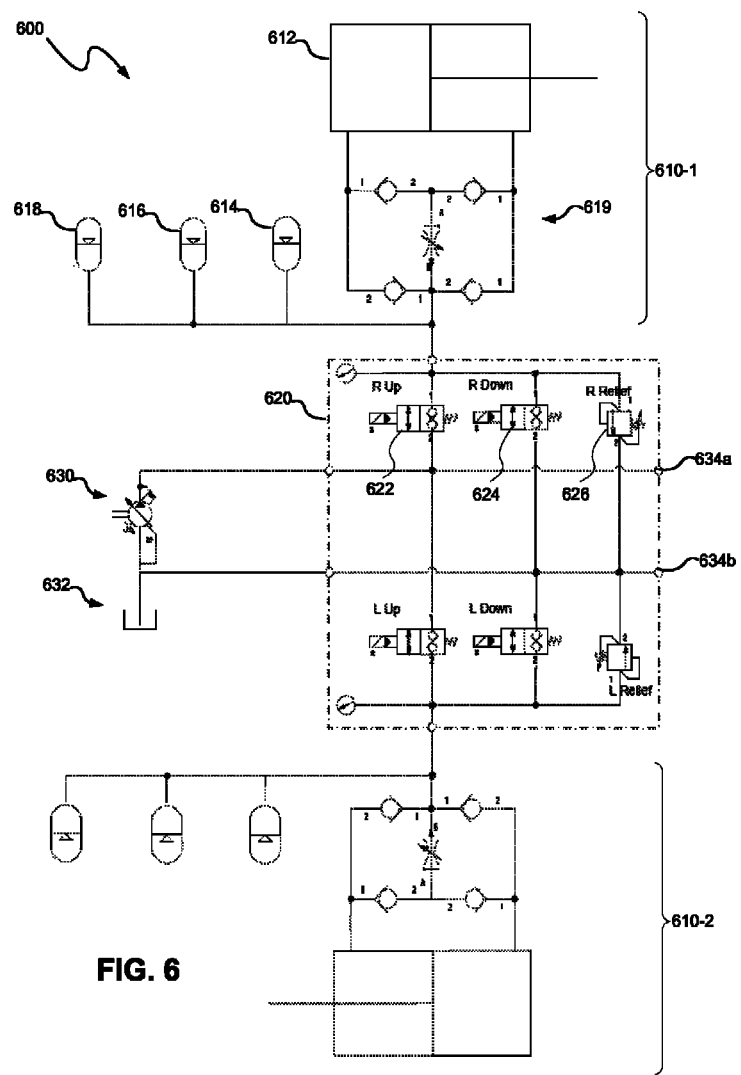
FIG. 6 is a diagram illustrating an exemplary hydropneumatic suspension system that may be controlled by a ride height control system and method, consistent with the present disclosure.
Figure 7:
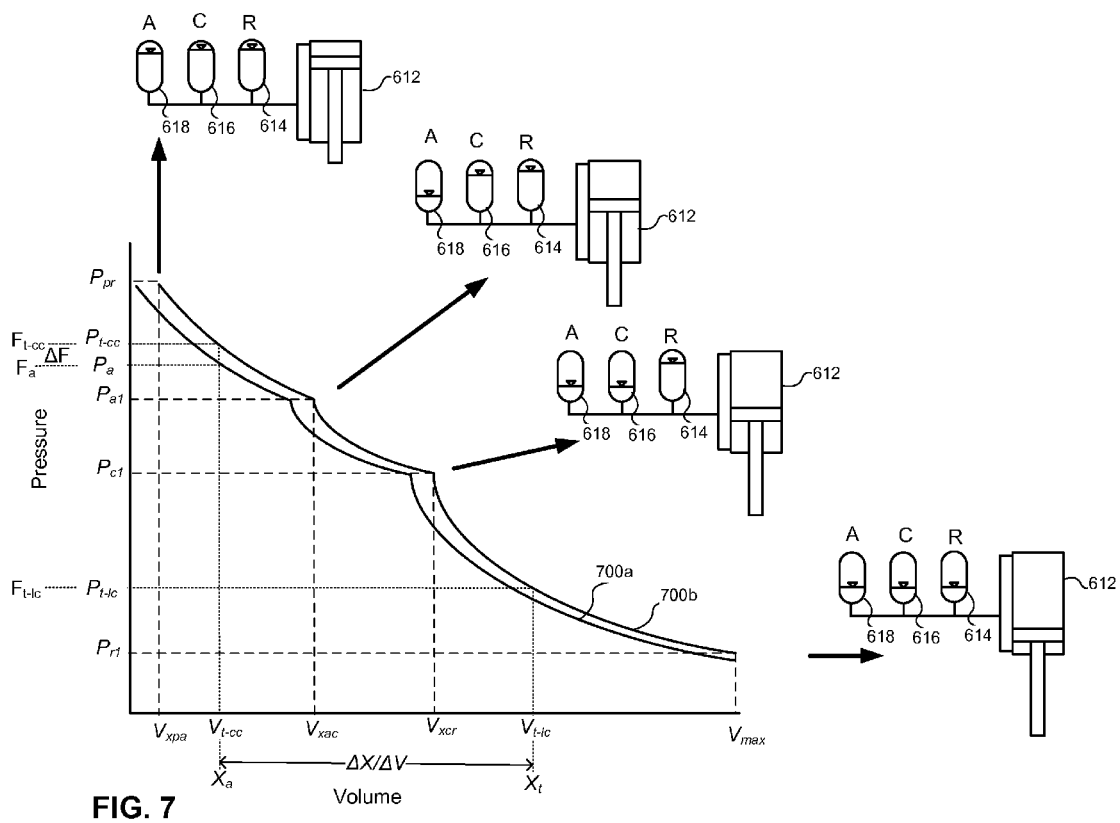
FIG. 7 is a diagram illustrating system pressure as a function of total accumulator gas volume in an exemplary hydropneumatic suspension system and the transformation of forces/pressures from a level condition to a current condition.

Referring to FIGS. 6 and 7, the mapping or transformation of forces between different displacement conditions is described in greater detail in the context of an exemplary hydropneumatic system. FIG. 6 shows an exemplary hydropneumatic suspension system 600 that may be controlled using the ride height control systems and methods described herein. The hydropneumatic suspension system 600 is shown for one axle (i.e., two wheel locations) in a vehicle, and the same configuration may be used for each axle of a multi-axle vehicle.

The suspension system 600 includes a hydropneumatic spring and damper system 610-1, 610-2 between the unsprung and sprung masses at each wheel location, a manifold axle module 620 coupled between the hydropneumatic spring and damper systems 610-1, 610-2 at each axle, and a variable displacement pump 630 and tank 632 coupled to the manifold axle module 620 for supplying and removing fluid to and from the hydropneumatic spring and damper systems 610-1, 610-2. The variable displacement pump 630 and reservoir tank 632 may be coupled to additional axle modules at locations 634a, 634b. The manifold axle module 620 may include a first valve 622 for controlling the addition of fluid to the damper system 610-1, a second valve 624 for controlling the removal of fluid from the damper system 610-1, and a pressure relief valve 626.

Each hydropneumatic spring and damper system 610-1 includes a damper 612 coupled to one or more accumulators 614, 616, 618 via a check valve manifold 619 including a damper control valve. The accumulators 614, 616, 618 may include a rebound accumulator 614, a compression accumulator 616, and an anti-bleed accumulator 618 coupled in series to a common rail with increasing precharge pressures (i.e., $P_{r1}<P_{c1}<P_{a1}$). In one example, the rebound accumulator 614 may have a precharge pressure ($P_{r1}$) of 1000 psi, the compression accumulator 616 may have a precharge pressure ($P_{c1}$) of 2500 psi, and the anti-bleed accumulator 618 may have a precharge pressure ($P_{a1}$) of 3000 psi. At the precharge pressures $P_{r1}$, $P_{c1}$, $P_{a1}$, the accumulators have respective precharge volumes $V_{r1}$, $V_{c1}$, $V_{a1}$ (i.e., the volume of gas in the accumulator in the precharge state). In such a system, ride height may be controlled at each wheel location by controlling the fluid volume in the system between the accumulators 614, 616, 618 and the damper 612 at that wheel location.

Although the exemplary embodiment includes a three accumulator hydropneumatic suspension system, the ride height control system and method may be used in hydropneumatic suspension systems with only one or two accumulators. A two accumulator hydropneumatic suspension system may include rebound and compression accumulators and a one accumulator hydropneumatic suspension system may include only one of the accumulators.

As shown in FIG. 7, the non-linear force-deflection characteristic of the hydropneumatic suspension system may be represented by mapping the system pressure P to total accumulator gas volume V across the operating ranges of the accumulators 614, 616, 618, as shown by curves 700a, 700b. The system pressure P corresponds to the fluid pressure in the damper 612 (i.e., against the damper rod). The accumulator precharge pressures $P_{r1}$, $P_{c1}$, $P_{a1}$ and the relief valve pressure $P_{pr}$ define the operating range of the accumulator system along the pressure axis. When the pressure rises above $P_{r1}$, the rebound accumulator 614 begins to take some of the fluid from the damper 612. When the pressure rises above $P_{c1}$, the compression accumulator 616 begins to take some of the fluid while the rebound accumulator 614 may still accept fluid. When the pressure rises above $P_{a1}$, the anti-bleed accumulator 618 begins to take some of the fluid while the rebound accumulator 614 and the compression accumulator 616 may still accept fluid.

The volume V corresponds to the total volume of gas in the accumulators. The volume V is a maximum when all of the accumulators are gas and topped out or empty of fluid ($V_{max}=V_{r1}+V_{c1}+V_{a1}$) and the suspension system is not providing any force to the sprung mass. The pressure just as the system reaches $V_{max}$ is the precharge pressure $P_{r1}$ of the rebound accumulator 614. The volume is reduced to $V_{max}$ at the cross-over point when the system pressure equals the precharge pressure $P_{c1}$ of the compression accumulator 616. The volume is reduced to $V_{xac}$ at the cross-over point when the system pressure equals the precharge pressure $P_{a1}$ of the anti-bleed accumulator 618. The volume is reduced to $V_{xpa}$ when the system pressure equals the pressure relief valve bleed off pressure $P_{pr}$. Thus, the operating ranges for the volume axis are defined by the reference points $V_{max}$, $V_{xcr}$, $V_{xac}$, $V_{xpa}$.

When the position X changes at a wheel location of the suspension system, the rod moves in the damper 612 and a volume of fluid ΔV is transferred between the damper 612 and the accumulators 614, 616, 618, which corresponds to a change in the total accumulator gas volume. When the load or force changes at a wheel location of the suspension system, system pressure changes because the load corresponds to the fluid pressure in the damper multiplied by the rod area (e.g., $A_{rod}$). Thus, changes in the load/force may be correlated with changes in system pressure and changes in position may be correlated with changes in total accumulator volume. For example, a change in force ΔF between an actual force $F_a$ and a current condition target force $F_{t-cc}$ corresponds to a change in system pressure and a change in position ΔX between a target ride height position $X_t$ and an actual position $X_a$ corresponds with a change in total accumulator gas volume. Although changes in position correspond to changes in total accumulator gas volume for a given volume of fluid in the system, there is no fixed relationship between position and the total accumulator gas volume because the volume of oil in the system varies (e.g., as a result of ride height changes and leveling).

The loads or forces in the exemplary hydropneumatic suspension system may be mapped or transformed between displacement conditions by using the relationship between pressure and volume changes in the accumulators defined as follows:

$$P_i V_i^n = P_j V_j^n \qquad (11)$$

where i and j are different states of compression in an accumulator, P is gas pressure in the accumulator, V is the gas volume in the accumulator, and n is an exponent that depends on the gas properties. In the exemplary embodiment, n is set to 1 reflecting an isothermal event; however, n may be other values (e.g., between 1 and 1.4 representing the bounds of a continuous spectrum between isothermal and adiabatic) in other embodiments. For the operating range of the rebound accumulator 614, for example, the volume/pressure equation (11) may be as follows:

$$P_{c1}*V_{r2} = P_{r1}*V_{r1} \qquad (12)$$

where the pressure increases from $P_{r1}$ to $P_{c1}$ and the gas volume in the rebound accumulator 614 is reduced from $V_{r1}$ to $V_{r2}$. The change in volume during this operating range may thus be represented as follows:

$$\Delta V = V_{r1} - V_{r2} = V_{r1} - \frac{P_{r1}*V_{r1}}{P_{c1}} \qquad (13)$$

The total accumulator volume remaining after this change in volume ΔV may thus be represented as follows:

$$V_{total} = V_{xcr} = V_{max} - \left(V_{r1} - \frac{P_{r1}*V_{r1}}{P_{c1}}\right) \qquad (14)$$

For a total accumulator volume $V_{total}$ between the operating range of $V_{xcr}$ and $V_{max}$ ($V_{xcr}<V_{total}<V_{max}$) and a system pressure $P_s$ between the operating range of $P_{c1}$ and $P_{r1}$ ($P_{c1}>P_s>P_{r1}$), therefore, the total volume and system pressure may be represented as follows:

$$V_{total} = V_{max} - \left(V_{r1} - \frac{P_{r1} * V_{r1}}{P_s}\right) \quad (15)$$

$$P_s = \frac{P_{r1} * V_{r1}}{V_{r1} + V_{total} - V_{max}} \quad (16)$$

For the operating range in each accumulator in the suspension system, therefore, the total accumulator gas volume $V_{total}$ on the X-axis and the static system pressure $P_s$ on the Y-axis may be generalized using on the following volume and pressure equations:

$$V_{total} = V_{static} + \left(\frac{P_{start} * V_{active}}{P_s}\right) \quad (17)$$

$$P_s = \frac{P_{start} * V_{active}}{V_{total} - V_{static}} \quad (18)$$

The operating ranges of the total accumulator volume ($V_{start}$ to $V_{stop}$) and the system pressure ($P_{start}$ to $P_{stop}$) for each of the accumulators and the variables $P_{start}$, $V_{active}$, $V_{static}$ used in the volume and pressure equations (17) and (18) for each of those operating ranges are defined in the following Table I:

TABLE I

| Range | $V_{start}$ | $V_{stop}$ | $P_{start}$ | $P_{stop}$ | $V_{active}$ | $V_{static}$ |
|---|---|---|---|---|---|---|
| Rebound | $V_{a1} + V_{c1} + V_{r1}$ (i.e., $V_{max}$) | $V_{xcr}$ | $P_{r1}$ | $P_{c1}$ | $V_{r1}$ | $V_{a1} + V_{c1}$ |
| Compression | $V_{a1} + V_{c1} + \frac{V_{r1}P_{r1}}{P_{c1}}$ (i.e., $V_{xcr}$) | $V_{xac}$ | $P_{c1}$ | $P_{a1}$ | $V_{c1} + \frac{V_{r1}P_{r1}}{P_{c1}}$ | $V_{a1}$ |
| Anti Bleed | $V_{a1} + \frac{V_{c1}P_{c1}}{P_{a1}} + \frac{V_{r1}P_{r1}}{P_{a1}}$ (i.e., $V_{xac}$) | $V_{xpa}$ | $P_{a1}$ | $P_{pr}$ | $V_{a1} + \frac{V_{c1}P_{c1}}{P_{a1}} + \frac{V_{r1}P_{r1}}{P_{a1}}$ | 0 |

$V_{start}$ is the starting volume of the sum of the accumulator air volumes along the X-axis at the low pressure end of the operating range of the accumulator. $P_{start}$ is the starting pressure of the accumulator operating range at the low pressure/high volume end of that range. $V_{active}$ is the starting volume of the pressurized air in the accumulator that is being compressed or expanded throughout the accumulator operating range. $V_{static}$ is the volume of air that is not changing over the accumulator operating range. The rebound accumulator 614 has an operating range between a system pressure of $P_{r1}$ and $P_{c1}$ and between a total accumulator volume of $V_{max}$ and $V_{xcr}$. The compression accumulator 616 has an operating range between a system pressure of $P_{c1}$ and $P_{a1}$ and between a total accumulator volume of $V_{xcr}$ and $V_{xac}$. The anti-bleed accumulator 618 has an operating range between a system pressure of $P_{c1}$ and $P_{pr}$ and between a total accumulator volume of $V_{xac}$ and $V_{xpa}$ (e.g., 0).

Given a target pressure corresponding to a target force (e.g., $F_{t-lc}$) to be applied for one displacement condition (e.g., at position $X_t$), the pressure/volume relationships can be used to determine the target pressure for the corresponding target force ($F_{t-cc}$) that should be applied for another displacement condition (e.g., at position $X_a$). If a level condition TRH force $F_{t-lc}$ is known, the associated target pressure $P_{t-lc}$ that will provide that force may be determined by removing any spring load contribution and solving for pressure, for example, as described above in connection with the planar TRH force $F_{t-p}$ and equation (10). The level condition target pressure $P_{t-lc}$ and the target ride height position $X_t$ may then be used to determine the current condition target pressure $P_{t-cc}$ at the position $X_a$ for the current condition by mapping between the system pressures and accumulator operating volume points based on the relationships defined by the equations set forth above. The mapping may be performed using any practicable means such as a direct algebraic formulation or a previously complied look-up table.

Using the total accumulator volume equation (17) and the appropriate values from Table I, the total accumulator volume $V_{t-lc}$ corresponding to the target pressure $P_{t-lc}$ may be determined as follows:

$$V_{t-lc} = V_{static} + \left(\frac{P_{start} * V_{active}}{P_{t-lc}}\right) \quad (19)$$

The appropriate values from Table I are used in equation (19) depending upon where the pressure $P_{t-lc}$ lies relative to the accumulator operating pressure ranges between $P_{start}$ and $P_{stop}$. If the pressure $P_{t-lc}$ falls between the pressures $P_{r1}$ and $P_{c1}$ ($P_{r1}<P_{t-lc}<P_{c1}$), for example, variables $V_{start}$, $P_{start}$, and $V_{static}$ for the rebound accumulator operating range are used.

For a fixed fluid volume in the system, change in volume when the damper rod moves from the actual position $X_a$ to the target position $X_t$ is equivalent to the change in total gas volume across all of the accumulators ($\Delta V = V_{t-cc} - V_{t-lc}$) as a result of this position change. Thus, the total accumulator volume $V_{t-cc}$ for the current condition at $X_a$ may be determined from the total accumulator volume $V_{t-lc}$ for the level condition at $X_t$ as follows:

$$V_{t-cc} = V_{t-lc} + A_{rod}(X_a - X_t)/RM \quad (20)$$

Using the system pressure equation (18) and the appropriate values from Table I, the target pressure $P_{t-cc}$ corresponding to this total accumulator volume $V_{t-cc}$ may be determined as follows:

$$P_{t-cc} = \left(\frac{P_{start} * V_{active}}{(V_{t-cc} - V_{static})}\right) \quad (21)$$

The appropriate values from Table I are used in equation (19) depending upon where the volume $V_{t-lc}$ lies between the accumulator operating volume ranges between $V_{start}$ and $V_{stop}$. If the volume $V_{t-lc}$ falls between the volumes $V_{xac}$ and $V_{xpa}$ ($V_{xac} > V_{t-lc} > V_{xpa}$), for example, the variables $V_{active}$, $P_{start}$, and $V_{static}$ for the anti-bleed accumulator operating range are used.

Given a system pressure at a position, the volume and pressure equations defined above may similarly be used to determine any other system pressure at a different position (i.e., on a pressure/volume curve 700*a*, 700*b*). Given the current pressure $P_a$ at the actual position $X_a$, for example, the volume and pressure equations may be used to determine what the pressure would be at the target ride height position $X_t$ on the pressure/volume curve 700*a*. In some embodiments, this pressure may be used to determine what the force $F_t$ would be at the target ride height $X_t$ for each of the wheel locations and then that force $F_t$ at each of the wheel locations may be used in the matrix calculations to determine planar target forces for the level condition at target ride height $X_t$. As described above, however, a more direct approach uses the actual force $F_a$ at each of the wheel locations in the matrix calculations to determine terrain-independent planar target forces. Although the equations described herein have been derived for a three accumulator system, equations may be similarly derived for hydropneumatic suspension systems with other numbers of accumulators.

Referring back to FIG. 1, the target force processor 120 in the ride height control system 100 may perform the transformation calculations using the volume and pressure equations described above. Because the precharge pressures and volumes are known, the variables in Table I and the product $P_{start} * V_{start}$ may be precomputed and stored. For example, the variables may be precomputed during initialization and updated to account for changes during tuning without powering down.

The target force processor 120 may also perform the comparisons between the system pressure and/or total accumulator volume and the variables that define the operating ranges. Based on those comparisons, the target force processor 120 may select the appropriate precomputed value and perform the calculations using the volume and pressure equations. The target force processor 120 may also perform the calculations that convert between corresponding pressure and force.

Figure 8:
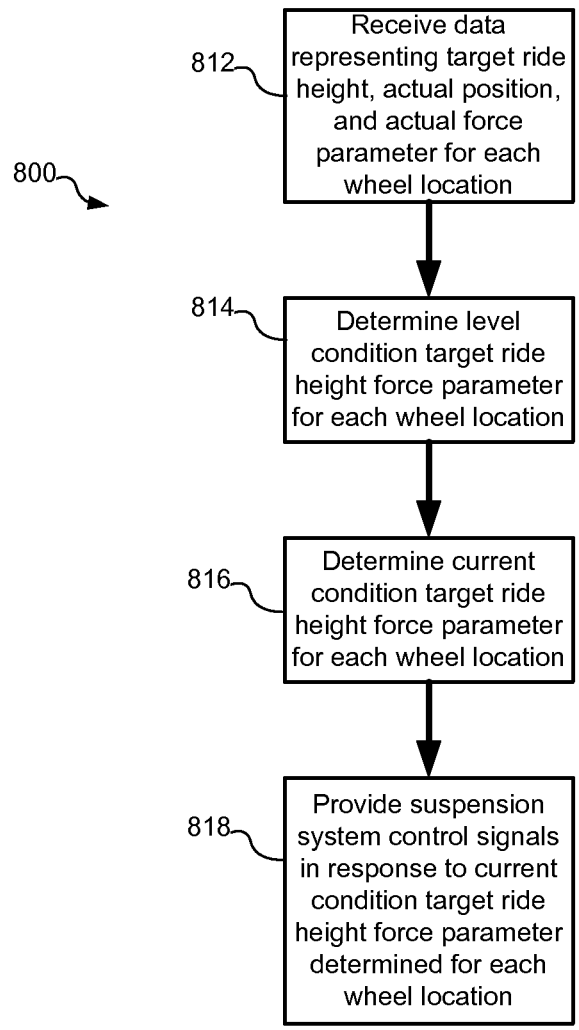
FIG. 8 is a flow chart illustrating one embodiment of a method of controlling a suspension system to provide target ride height forces at a current condition based on target ride height forces determined for a level condition.

As illustrated in FIG. 8, one method 800 for controlling a suspension system adjusts the forces applied by the suspension system at the wheel locations under a current condition based on TRH forces determined for a level condition at ride height on a relatively flat surface. The method 800 includes receiving 812 data representing target ride height, actual position, and actual force parameters for each wheel condition. The actual force parameter data may include directly measured actual forces or parameters such as measured pressure used to calculate actual forces, for example, as described above.

The method 800 also includes determining 814 a level condition TRH force parameter for each wheel location. The level condition TRH force parameter may be a planar TRH force determined as described above. The level condition TRH force parameter may be determined, for example, by calculating the planar TRH forces that fit a best fit plane relative to the actual forces at the wheel locations (i.e., under the current condition). Alternatively, the level condition TRH force may be determined by first transforming the actual forces to the level condition and then calculating the planar TRH forces that fit a best fit plane relative to the forces transformed to the level condition. In other embodiments, the level condition TRH force parameter may be based on some other desired load distribution.

The method 800 further includes determining 816 a corresponding current condition target force parameter for each wheel location by transforming the level condition TRH force parameter to the current condition. The current condition target force parameter may be a target pressure determined by mapping a pressure corresponding to the level condition TRH force to a current condition using a defined force/deflection characteristic. In the exemplary three accumulator hydropneumatic suspension system described above, for example, the volume and pressure mapping equations may be used to determine the target pressure for the current condition based on the pressure for the level condition.

Suspension system control signals may then be provided 818 in response to the current condition target force parameter determined for each wheel location to control the suspension system as described above. The suspension system control signals may be provided, for example, in response to a differential or error between the actual pressure and the target pressure associated with the current condition target force to control the pressure such that the error is minimized. In the exemplary hydropneumatic suspension system, the suspension system control signals control the pumping of fluid or draining of fluid from the accumulator and damper system to adjust the pressure until the error is minimized.

Figure 9:
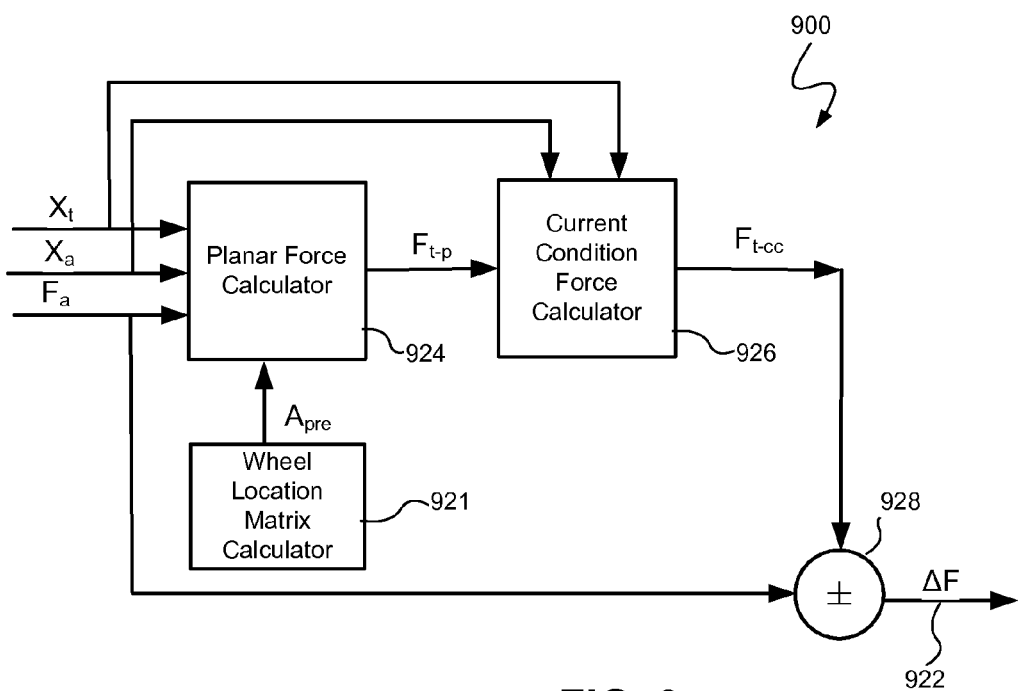
FIG. 9 is a schematic functional block diagram of another embodiment of a ride height control system for controlling load distribution in a suspension system by providing target ride height forces at a current condition based on planar target ride height forces determined for a level condition.

Referring to FIG. 9, another embodiment of a ride height control system 900 controls the target ride height and target ride height load distribution by determining the forces to be applied during a wheel displacement condition, which would result in planar forces during a level condition. The ride height control system 900 may receive data representing target ride height, actual positions, and actual force parameters as described above. In this embodiment, the ride height control system 900 may include a planar force calculator 924 for calculating a planar TRH force parameter $F_{t-p}$, for example, using the matrix calculations described above. A wheel location matrix calculator 921 may be used to separately precompute the wheel location matrix $A_{pre}$ for use together with the actual forces in calculating the planar forces as described above.

The ride height control system 900 may also include a current condition force calculator 726 for calculating a current condition target force parameter $F_{t-cc}$ by transforming the planar level condition TRH force parameter $F_{t-p}$ to the current condition, for example, using a defined monotonic force-deflection characteristic as described above. The ride height control system 900 may also include an error signal generator 928 to generate an error signal 922 representing a difference $\Delta F$ between the actual force parameter $F_a$ and the current condition target force parameter $F_{t-cc}$. The error signal 922 may be used in a control loop to control the suspension system as described above.

Figure 10:
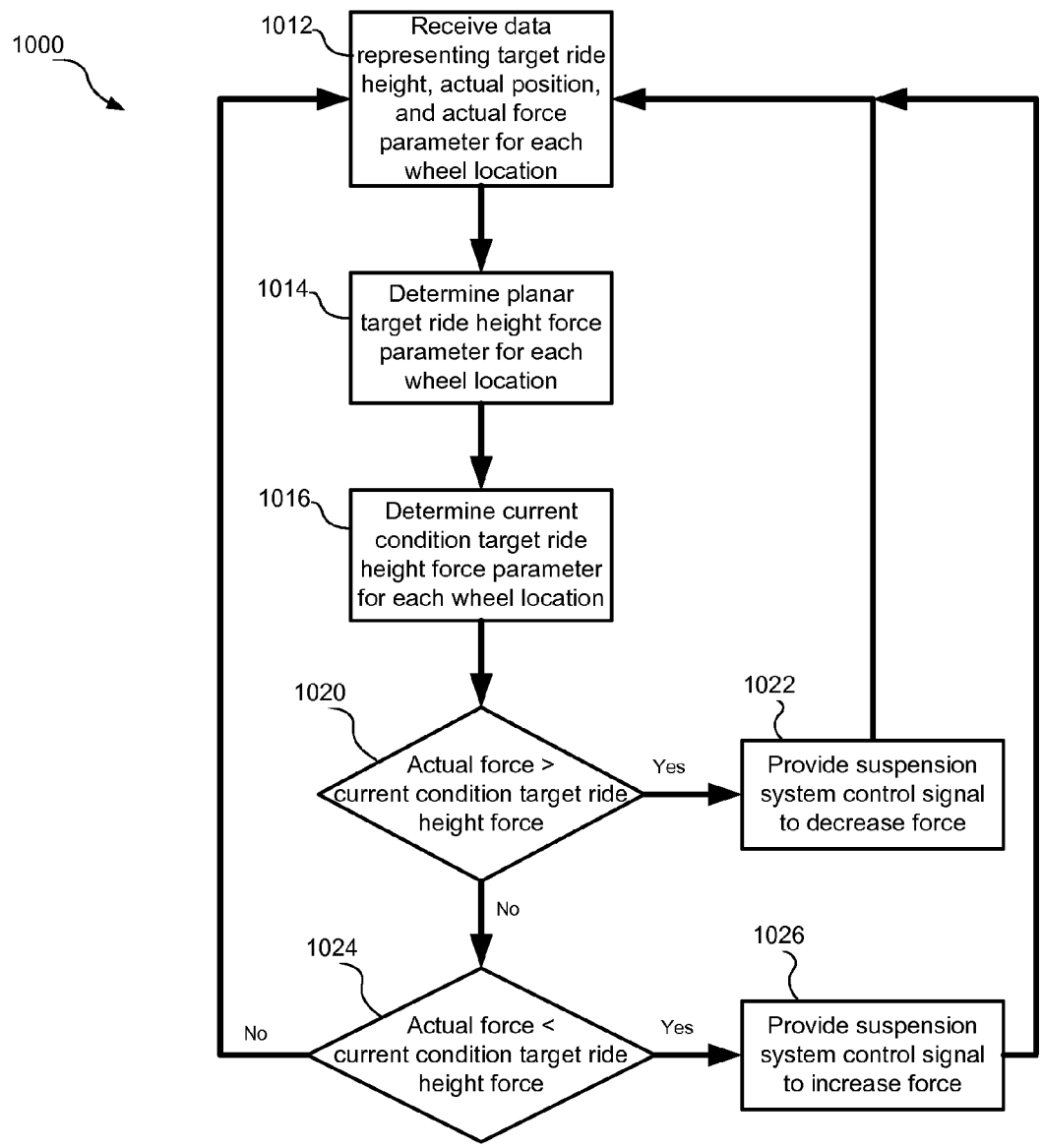
FIG. 10 is a flow chart illustrating one embodiment of a method of controlling load distribution in a suspension system to provide target ride height forces at a current condition based on planar target ride height forces determined for a level condition.

As illustrated in FIG. 10, a further method 1000 for controlling a suspension system combines both the planar calculation technique and the transformation to current condition technique described above to adjust the forces applied by the suspension system at the wheel locations. The method 1000 receives 1012 the data, determines 1014 the planar TRH force parameter for each wheel location, and determines 1016 the current condition target force parameter for each wheel location. If the method determines 1020 that the actual force parameter is greater than the current condition target force parameter at a wheel location, then a suspension system control signal is provided 1022 to decrease the force at that wheel location. If the method determines 1024 that the actual force parameter is less than the current condition target force parameter at a wheel location, then a suspension system control signal is provided 1026 to increase the force at that wheel location.

Accordingly, the ride height control system and method, consistent with the embodiments described herein, enables ride height control with proper load distribution in a suspension system under various types of conditions.

Consistent with an embodiment, a method of controlling a suspension system includes: receiving data representing a target ride height, an actual position between the sprung mass and the unsprung mass at each of a plurality of wheel locations of the vehicle, an actual force parameter related to an actual force applied to the sprung mass at each of the plurality of wheel locations of the vehicle; determining a level condition TRH force parameter related to a target force to be applied to the sprung mass at each of the plurality of wheel locations of the vehicle if the vehicle were at the target ride height on a relatively level surface, the level condition TRH force parameter being based, at least in part, on a desired force distribution at the wheel locations; determining a current condition target force parameter related to a target force to be applied to the sprung mass at each of the plurality of wheel locations of the vehicle by transforming the level condition TRH force parameter determined for each of the wheel locations to a current condition, the current condition target force parameter at a respective one of the wheel locations being based, at least in part, on the level condition TRH force parameter, the target ride height, and the actual position for the respective one of the wheel locations; and providing at least one suspension system control signal to the suspension system in response to the current condition target force parameter determined for each of the wheel locations.

Consistent with another embodiment, a method of controlling a suspension system includes: receiving data representing a target ride height, an actual position between the sprung mass and the unsprung mass at a each of a plurality of wheel locations of the vehicle, and an actual pressure in the suspension system at each of the plurality of wheel locations of the vehicle; determining a planar TRH force to be applied to the sprung mass at each of the plurality of wheel locations of the vehicle when the vehicle is at the target ride height under a level condition, wherein force vectors associated with the planar TRH force at each of the wheel locations fit a best fit plane; determining a current condition target pressure to be provided in the suspension system at each of the plurality of wheel locations of the vehicle by determining a level condition TRH pressure from the planar TRH force and transforming the level condition TRH pressure determined for each of the wheel locations to a current condition; and providing at least one suspension system control signal to the suspension system in response to the current condition target pressure determined for each of the wheel locations.

Consistent with a further embodiment, a ride height control system includes a target force processor configured to receive data representing a target ride height, an actual position between the sprung mass and the unsprung mass at each of a plurality of wheel locations of the vehicle, an actual force parameter related to an actual force applied to the sprung mass at each of the plurality of wheel locations of the vehicle. The target force processor is also configured to determine a level condition TRH force parameter related to a target force to be applied to the sprung mass at each of the plurality of wheel locations of the vehicle if the vehicle were at the target ride height on a relatively level surface. The level condition TRH force parameter is based, at least in part, on a desired force distribution at the wheel locations. The target force processor is further configured to determine a current condition target force parameter related to a target force to be applied to the sprung mass at each of the plurality of wheel locations of the vehicle by transforming the level condition TRH force parameter determined for each of the wheel locations to a current condition. The current condition target force parameter at a respective one of the wheel locations is based, at least in part, on the level condition TRH force parameter, the target ride height, and the actual position for the respective one of the wheel locations.

Consistent with yet another embodiment, a ride height control system includes a target force processor configured to receive data representing a target ride height, an actual position between the sprung mass and the unsprung mass at a each of a plurality of wheel locations of the vehicle, and an actual pressure in the suspension system at each of the plurality of wheel locations of the vehicle. The target force processor is also configured to determine a planar TRH force to be applied to the sprung mass at each of the plurality of wheel locations of the vehicle when the vehicle is at the target ride height under a level condition. Force vectors associated with the planar TRH force at each of the wheel locations fit a best fit plane. The target force processor is further configured to determine a current condition target pressure to be provided in the suspension system at each of the plurality of wheel locations of the vehicle by determining a level condition TRH pressure from the planar TRH force and transforming the level condition TRH pressure determined for each of the wheel locations to a current condition.

Consistent with yet another embodiment, a controlled vehicle suspension includes a suspension system component between a sprung mass and an unsprung mass at each of a plurality of wheel locations and a ride height control system configured to receive data representing a target ride height, an actual position between the sprung mass and the unsprung mass at a each of the plurality of wheel locations of the vehicle, and an actual pressure in the suspension system at each of the plurality of wheel locations of the vehicle. The ride height control system is also configured to determine a planar TRH force to be applied to the sprung mass at each of the plurality of wheel locations of the vehicle when the vehicle is at the target ride height under a level condition. Force vectors associated with the planar TRH force at each of the wheel locations fit a best fit plane. The ride height control system is further configured to determine a current condition target pressure to be provided in the suspension system at each of the plurality of wheel locations of the vehicle by determining a level condition TRH pressure from the planar TRH force and transforming the level condition TRH pressure determined for each of the wheel locations to a current condition. The ride height control system is further configured to generate an error signal representing a force parameter error at each of the wheel locations. The force parameter error represents a difference between the actual pressure obtained for a respective one of the wheel locations and the current condition target pressure. The suspension system also includes a suspension control system configured to provide at least one suspension system control signal to the suspension system in response to the current condition target pressure determined for each of the wheel locations.

While the principles of the invention have been described herein, it is to be understood by those skilled in the art that this description is made only by way of example and not as a limitation as to the scope of the invention. The term "exemplary" is used herein to refer to merely an example and does not necessarily refer to a preferred or meritorious example. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method of controlling a suspension system between a sprung mass and an unsprung mass in a vehicle, the method comprising:

receiving data representing a target ride height, an actual position between the sprung mass and the unsprung mass at each of a plurality of wheel locations of the vehicle, an actual force parameter related to an actual force applied to the sprung mass at each of the plurality of wheel locations of the vehicle;

determining by a ride height control system, a level condition target ride height (TRH) force parameter related to a target force to be applied to the sprung mass at each of the plurality of wheel locations of the vehicle if the vehicle were at the target ride height on a relatively level surface, the level condition TRH force parameter being based, at least in part, on a desired force distribution at the wheel locations;

determining by a ride height control system, a current condition target force parameter related to a target force to be applied to the sprung mass at each of the plurality of wheel locations of the vehicle by transforming the level condition TRH force parameter determined for each of the wheel locations to a current non-level condition, the current condition target force parameter at a respective one of the wheel locations being based, at least in part, on the level condition TRH force parameter, the target ride height, and the actual position for the respective one of the wheel locations; and providing at least one suspension system control signal to the suspension system in response to the current condition target force parameter determined for each of the wheel locations.

2. The method of claim 1 wherein the desired force distribution is a planar force distribution, and wherein determining the level condition TRH force parameter includes determining a planar level condition TRH force parameter for each of the plurality of wheel locations of the vehicle, wherein force vectors associated with the planar TRH force parameter determined for each of the wheel locations fit a best fit plane.

3. The method of claim 2 wherein the force vectors associated with the planar TRH force parameter determined for each of the wheel locations fit a best fit plane relative to force vectors associated with the actual forces at the wheel locations of the vehicle.

4. The method of claim 2 wherein determining the planar target force comprises:

obtaining a precomputed x-y wheel location matrix, the precomputed x-y wheel location matrix being based on fixed wheel locations in x and y directions, the x direction being directed longitudinally of the vehicle and the y direction being directed laterally of the vehicle; and calculating the planar TRH force parameter based, at least in part, on the precomputed x-y wheel location matrix and the actual forces at the wheel locations.

5. The method of claim 1 wherein determining the level condition TRH force parameter for each of the plurality of wheel locations comprises:

determining a force parameter related to a force that would be applied to the sprung mass at each of the plurality of wheel locations of the vehicle if the vehicle was at the target ride height on the relatively level surface, the force parameter being determined for a respective one of the wheel locations by transforming the actual force parameter at the actual position for the respective one of the wheel locations to the target ride height; and determining a planar level condition TRH force parameter for each of the plurality of wheel locations of the vehicle based on, at least in part, the force parameters determined for the wheel locations if the vehicle was at the target ride height on the relatively flat surface, wherein force vectors associated with the planar TRH force parameter determined for each of the wheel locations fit a best fit plane.

6. The method of claim 1 wherein providing the at least one suspension control signal comprises:

determining a force parameter error at each of the wheel locations, the force parameter error representing a difference between the actual force parameter obtained for a respective one of the wheel locations and the current condition target force parameter determined for the respective one of the wheel locations; and providing the at least one suspension system control signal to change the actual forces at the wheel locations until the force parameter error is minimized.

7. The method of claim 1 wherein receiving data representing actual force parameters comprises:

receiving pressures measured in the suspension system at the wheel locations; and calculating actual reaction forces from the pressures measured at the wheel locations.

8. The method of claim 1 wherein the suspension system is a hydropneumatic suspension system, wherein the actual force parameter includes an actual pressure measured in the suspension system at each of the wheel locations.

9. The method of claim 8 wherein receiving the data representing actual force parameters comprises:

receiving pressures measured in the suspension system at the wheel locations; and calculating actual reaction forces from the pressures measured at the wheel locations.

10. The method of claim 8 wherein providing the suspension system control signal to the suspension system causes fluid to be added to or removed from the hydropneumatic suspension system to change the actual pressure in the suspension system at the wheel locations.

11. The method of claim 10 wherein the current condition target force parameter includes a current condition target pressure, and wherein providing the at least one suspension control signal comprises:

determining a force parameter error at each of the wheel locations, the force parameter error representing a difference between the actual pressure measured in the suspension system at a respective one of the wheel locations and the current condition target pressure determined for the respective one of the wheel locations; and providing the at least one suspension system control signal to change the actual pressures at the wheel locations until the force parameter error is minimized.

12. The method of claim 8 wherein determining the current condition target force parameter comprises:

determining a level condition TRH pressure from the level condition TRH force;

determining a level condition TRH accumulator volume from the level condition TRH pressure;

determining a current condition target accumulator volume from the level condition TRH accumulator volume and from a change in volume resulting from moving between the actual position and the target ride height; and determining a current condition target pressure from the current condition target accumulator volume.

13. The method of claim 12 further comprising:
determining a force parameter error at each of the plurality of wheel locations, responsive to a difference between an actual pressure measured at a respective one of the wheel locations and the current condition target pressure determined for the respective one of the wheel locations; and adding or removing fluid to or from the hydropneumatic suspension system to change the actual pressures at the plurality of wheel locations to minimize the force parameter errors.

14. A method of controlling a suspension system between a sprung mass and an unsprung mass in a vehicle, the method comprising:
receiving data representing a target ride height, an actual position between the sprung mass and the unsprung mass at a each of a plurality of wheel locations of the vehicle, and an actual pressure in the suspension system at each of the plurality of wheel locations of the vehicle;
determining by a ride height control system, a planar TRH force to be applied to the sprung mass at each of the plurality of wheel locations of the vehicle when the vehicle is at the target ride height under a level condition, wherein force vectors associated with the planar TRH force at each of the wheel locations fit a best fit plane;
determining by a ride height control system, a current condition target pressure to be provided in the suspension system at each of the plurality of wheel locations of the vehicle by determining a level condition TRH pressure from the planar TRH force and transforming the level condition TRH pressure determined for each of the wheel locations to a current non-level condition; and
providing at least one suspension system control signal to the suspension system in response to the current condition target pressure determined for each of the wheel locations.

15. The method of claim 14 wherein determining the current condition target pressure comprises:
determining the level condition TRH pressure from the level condition TRH force;
determining a level condition TRH accumulator volume from the level condition TRH pressure;
determining a current condition target accumulator volume from the level condition TRH accumulator volume and from a change in volume resulting from moving between the actual position and the target ride height; and
determining the current condition target pressure from the current condition target accumulator volume.

16. A ride height control system for use in controlling target ride height (TRH) forces in a vehicle suspension system, the ride height control system comprising:
a target force processor configured to receive data representing a target ride height, an actual position between the sprung mass and the unsprung mass at a each of a plurality of wheel locations of the vehicle, an actual force parameter related to an actual force applied to the sprung mass at each of the plurality of wheel locations of the vehicle, wherein the target force processor is configured to determine a level condition TRH force parameter related to a target force to be applied to the sprung mass at each of the plurality of wheel locations of the vehicle if the vehicle were at the target ride height on a relatively level surface, the level condition TRH force parameter being based, at least in part, on a desired force distribution at the wheel locations, and wherein the target force processor is configured to determine a current condition target force parameter related to a target force to be applied to the sprung mass at each of the plurality of wheel locations of the vehicle by transforming the level condition TRH force parameter determined for each of the wheel locations to a current non-level condition, the current condition target force parameter at a respective one of the wheel locations being based, at least in part, on the level condition TRH force parameter, the target ride height, and the actual position for the respective one of the wheel locations.

17. The ride height control system of claim 16 further comprising an error signal generator configured to generate an error signal representing a force parameter error at each of the wheel locations, the force parameter error representing a difference between the actual force parameter obtained for a respective one of the wheel locations and the current condition target force parameter determined for the respective one of the wheel locations.

18. A ride height control system for use in controlling target ride height (TRH) forces in a vehicle suspension system, the ride height control system comprising:
a target force processor configured to receive data representing a target ride height, an actual position between the sprung mass and the unsprung mass at a each of a plurality of wheel locations of the vehicle, and an actual pressure in the suspension system at each of the plurality of wheel locations of the vehicle, wherein the target force processor is configured to determine a planar TRH force to be applied to the sprung mass at each of the plurality of wheel locations of the vehicle when the vehicle is at the target ride height under a level condition, wherein force vectors associated with the planar TRH force at each of the wheel locations fit a best fit plane, and wherein the target force processor is configured to determine a current condition target pressure to be provided in the suspension system at each of the plurality of wheel locations of the vehicle by determining a level condition TRH pressure from the planar TRH force and transforming the level condition TRH pressure determined for each of the wheel locations to a current non-level condition.

19. The ride height control system of claim 18 further comprising an error signal generator configured to generate an error signal representing a force parameter error at each of the wheel locations, the force parameter error representing a difference between the actual pressure obtained for a respective one of the wheel locations and the current condition target pressure.

20. A controlled vehicle suspension comprising:
a suspension system component between a sprung mass and an unsprung mass at each of a plurality of wheel locations;
a ride height control system configured to receive data representing a target ride height, an actual position between the sprung mass and the unsprung mass at a each of the plurality of wheel locations of the vehicle, and an actual pressure in the suspension system at each of the plurality of wheel locations of the vehicle, wherein the ride height control system includes a processor which is configured to determine a planar TRH force to be applied to the sprung mass at each of the plurality of wheel locations of the vehicle when the vehicle is at the target ride height under a level condition, wherein force vectors associated with the planar TRH force at each of the wheel locations fit a best fit plane, wherein the ride height control system is configured to determine a current condition target pressure to be provided in the suspension system at each of the plurality of wheel locations of the vehicle by determining a level condition TRH pressure from the planar TRH force and transforming the level condition TRH pressure determined for each of the wheel locations to a current non-level condition, and wherein the ride height control system is configured to generate an error signal representing a force parameter error at each of the wheel locations, the force parameter error representing a difference between the actual pressure obtained for a respective one of the wheel locations and the current condition target pressure; and a suspension control system configured to provide at least one suspension system control signal to the suspension system in response to the current condition target pressure determined for each of the wheel locations.

21. The controlled vehicle suspension system of claim 20 wherein the suspension system component includes a hydro-pneumatic spring and damper system between the unsprung and sprung masses at each of the wheel locations.

\* \* \* \* \*